United States Patent
Giráldez López et al.

(10) Patent No.: US 11,446,748 B2
(45) Date of Patent: Sep. 20, 2022

(54) MACHINING BALL TRACKS AND GUIDE WEBS OF AN INNER JOINT PART

(71) Applicants: GKN Driveline Deutschland GmbH, Offenbach (DE); GKN Driveline Vigo SA, Vigo (ES)

(72) Inventors: Miguel Ángel Giráldez López, Vigo (ES); Miguel Ángel Fernández Maroto, Vigo (ES); Horst Franke, Zwickau (DE)

(73) Assignees: GKN Driveline Deutschland GmbH, Offenbach (DE); GKN Driveline Vigo SA, Vigo (ES)

(*) Notice: Subject to any disclaimer, the term of this patent is extended or adjusted under 35 U.S.C. 154(b) by 0 days.

(21) Appl. No.: 16/342,290

(22) PCT Filed: Oct. 20, 2016

(86) PCT No.: PCT/EP2016/075280
§ 371 (c)(1),
(2) Date: Apr. 16, 2019

(87) PCT Pub. No.: WO2018/072835
PCT Pub. Date: Apr. 26, 2018

(65) Prior Publication Data
US 2020/0055127 A1    Feb. 20, 2020

(51) Int. Cl.
*B23C 3/34* (2006.01)
*B23C 3/02* (2006.01)

(52) U.S. Cl.
CPC ............ *B23C 3/34* (2013.01); *B23C 3/023* (2013.01); *Y10T 29/49636* (2015.01); *Y10T 29/49996* (2015.01)

(58) Field of Classification Search
CPC ..... B23C 3/023; B23C 3/34; Y10T 29/49636; Y10T 29/49995; Y10T 29/49996

USPC ..... 29/557, 558, 898; 451/51; 464/144, 145, 464/146
See application file for complete search history.

(56) References Cited

U.S. PATENT DOCUMENTS

| | | | |
|---|---|---|---|
| 3,277,613 A * | 10/1966 | Samuelg | ............... B24B 19/02 451/28 |
| 5,319,891 A * | 6/1994 | Becker | .................... B24D 7/18 451/28 |

(Continued)

FOREIGN PATENT DOCUMENTS

| | | |
|---|---|---|
| DE | 10056132 A1 | 5/2002 |
| DE | 10 2007 037 164 B3 | 7/2008 |

(Continued)

OTHER PUBLICATIONS

International Search Report and Written Opinion for PCT/EP2016/075280 dated Jul. 5, 2017 (12 pages; with English translation).
(Continued)

*Primary Examiner* — Erica E Cadugan
*Assistant Examiner* — Michael Vitale
(74) *Attorney, Agent, or Firm* — Bejin Bieneman PLC

(57) ABSTRACT

Machining ball tracks and guiding webs of an inner part for a constant velocity joint in a clamping arrangement includes mechanical machining of at least one first ball track in a first rotational position; rotating the articulated inner part into a second rotational position for machining at least one further ball track; wherein at least one guiding web is mechanically machined during the rotating of the inner joint part from the first rotational position into the second rotational position. A corresponding device is used for machining ball tracks and guiding webs of an inner joint part.

6 Claims, 5 Drawing Sheets

(56) References Cited

U.S. PATENT DOCUMENTS

| | | | | |
|---|---|---|---|---|
| 7,857,682 B2* | 12/2010 | Cremerius | ............. | B23C 3/023 |
| | | | | 29/558 |
| 8,282,322 B2* | 10/2012 | Hessbruggen | .......... | B23C 3/023 |
| | | | | 409/26 |
| 2002/0022437 A1* | 2/2002 | Yanagisawa | ............ | B24B 11/00 |
| | | | | 451/28 |
| 2006/0236542 A1* | 10/2006 | Walz | ....................... | F16D 3/223 |
| | | | | 29/893.35 |

FOREIGN PATENT DOCUMENTS

| | | | | |
|---|---|---|---|---|
| DE | 11 2004 001 170 B4 | 5/2009 | | |
| EP | 1 716 966 A2 | 11/2006 | | |
| JP | 57173413 A * | 10/1982 | ............. | B23C 3/04 |
| JP | S57173413 A | 10/1982 | | |
| JP | 58040214 A * | 3/1983 | ............. | B23C 3/34 |
| WO | 2006/058555 A1 | 6/2006 | | |
| WO | 2006058556 A1 | 6/2006 | | |
| WO | 2007096336 A1 | 8/2007 | | |

OTHER PUBLICATIONS

International Preliminary Report on Patentability for PCT/EP2016/075280 dated Feb. 13, 2019 (17 pages).
Written Opinion of the International Preliminary Examining Authority dated Aug. 30, 2018 (7 pages).

* cited by examiner

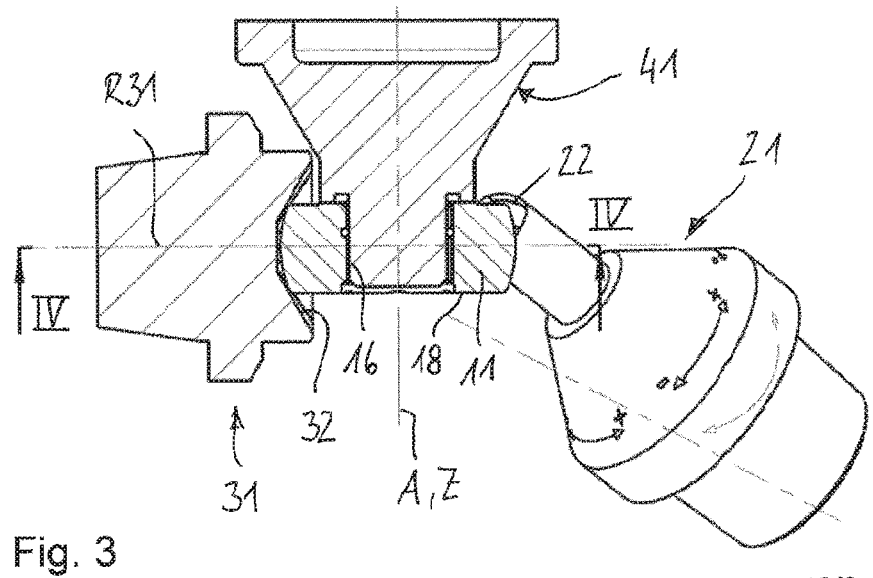
Fig. 3
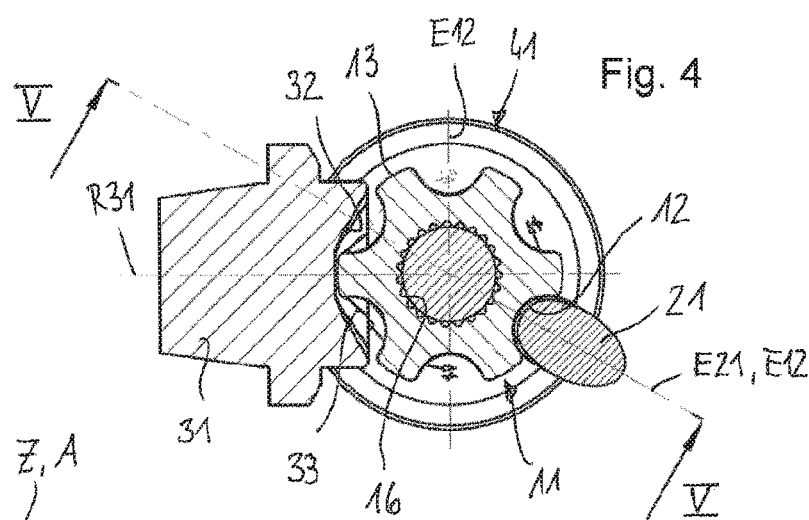
Fig. 4
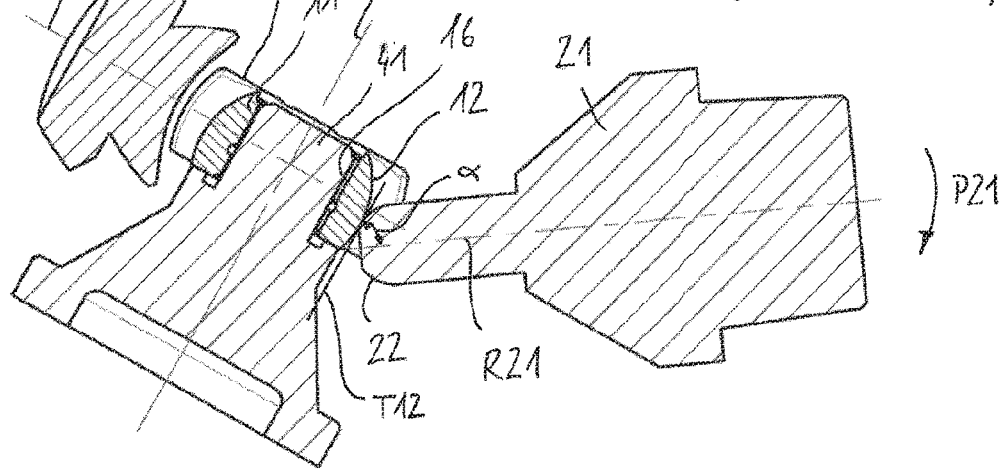
Fig. 5    B-B

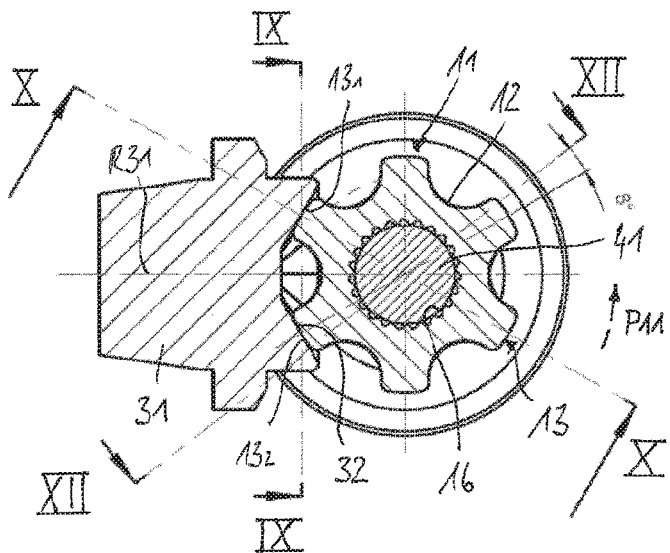
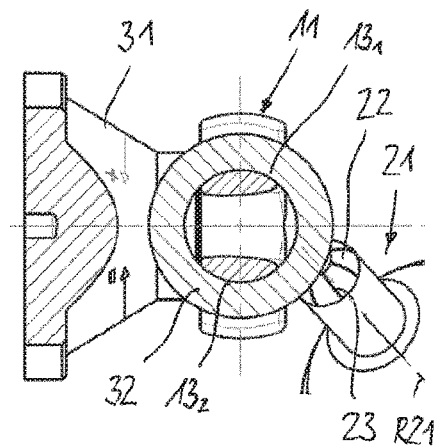
Fig. 8
Fig. 9
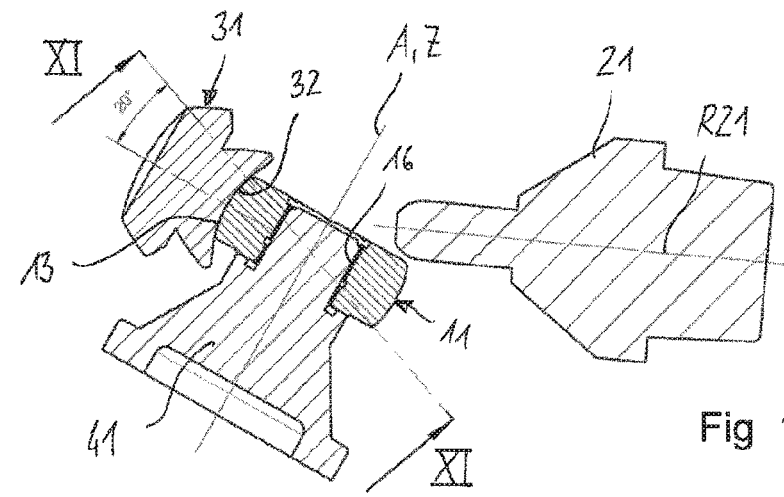
Fig 10
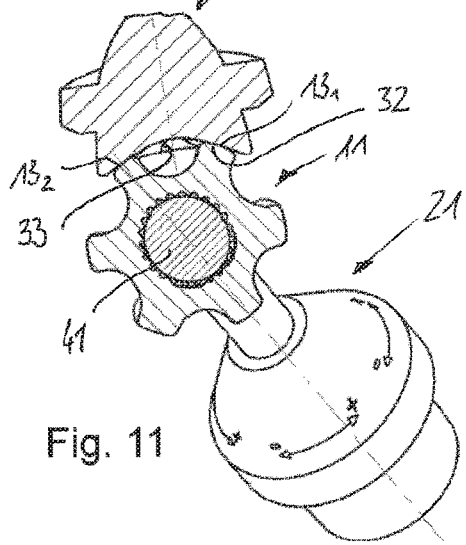
Fig. 11
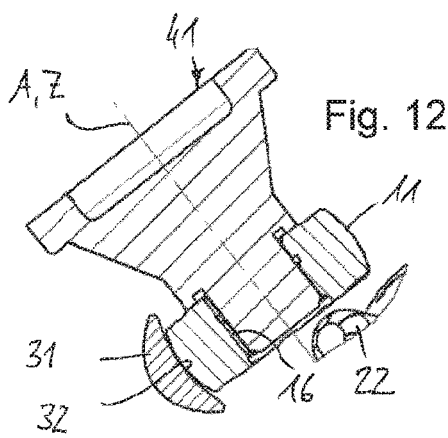
Fig. 12

MACHINING BALL TRACKS AND GUIDE WEBS OF AN INNER JOINT PART

CROSS-REFERENCE TO RELATED APPLICATIONS

This application is a national stage of, and claims priority to, Patent Cooperation Treaty Application No. PCT/EP2016/075280, filed on Oct. 20, 2016, which application is hereby incorporated herein by reference in its entirety.

BACKGROUND

Inner joint parts of constant velocity joints have a longitudinal axis A and comprise at least one guiding face by means of which the inner joint part is guided angularly movably to a ball cage. On this guiding face, a plurality of ball tracks are formed that are distributed over the circumference and divide the guiding face into a corresponding number of guiding webs. The ball tracks are configured to accommodate torque-transmitting balls of the constant velocity joint.

Constant velocity joints of the above type comprise, in addition to the inner joint part mentioned here, an outer joint part with outer ball tracks, torque-transmitting balls which are each guided in a pair of tracks consisting of an inner and an outer ball track, and a ball cage with circumferentially distributed cage windows in which the balls are held in one plane. A torque introduced into one of the two joint parts is transmitted via the circumferentially distributed balls to the other of the two joint parts. The balls move along the ball tracks when the joint is articulated.

Diverse types of constant velocity joints are known, wherein concerning movability fixed joints and plunging joints are generally distinguished. Fixed joints can essentially perform angular movements between the inner joint part and outer joint part and, apart from manufacturing tolerances and defined axial play, have no plunging capability. Such fixed type ball joints are realized by the applicant for example in the form of AC joints (angular contact), UF joints (undercut free), SIO joints and TBJ (twin ball joint). A special design of the fixed joints is the so-called counter track joint, which is characterized in that two groups of ball tracks are provided which open in opposite directions. Counter track joints are designed by the applicant as SX joints, for example.

Plunging joints are characterized in that, in addition to angular movability, they also have axial movability between the inner joint part and the outer joint part. Constant velocity plunging joints thus enable length compensation between an input part and an output part of a drive shaft. For example, constant velocity plunging joints can be used as gear-side joints in side shafts that connect an axle differential with a wheel of the motor vehicle for torque transmission. However, they are also used in propeller shafts for torque transmission between a multi-step transmission and an axle differential. Constant velocity plunging joints are distributed by the applicant as DO joints (double offset), VL joints (Löbro plunging joint) or SC joints (crosstrack), for example.

In the production of inner joint parts, it is known to carry out initially machining steps on the individual ball tracks and then machining steps on the guiding webs of the workpieces in a common clamping.

From DE 11 2004 001 170 B4, corresponding to WO 2006/058556 A1, a method and a device are known for machining inner joint parts of the above-mentioned type, in which at least one ball track and at least one guiding web are simultaneously mechanically machined. The simultaneous machining takes place by means of rotating tools. The tool for producing the guiding webs is designed as a disk tool, the axis of rotation of which crosses the longitudinal axis of the inner joint part at a distance, wherein the feed is effected exclusively radially to the longitudinal axis of the inner joint part. For producing the ball tracks, disc tools are used whose axes of rotation cross the longitudinal axis of the inner joint part at a distance, or finger tools whose axes of rotation are essentially radially aligned to the longitudinal axis of the inner joint part.

From WO 2007/096336 A1 a device and a process for machining of a spherical recess in a workpiece. The device comprises a clamping device into which the workpiece can be clamped and a cutting tool which rotates about a tool axis. The workpiece axis and the tool axis are inclined relative to each other in such a way that a central area of the tool is out of contact with the workpiece during production.

DE 100 56 132 A1 describes a process for machining the inner joint parts of constant velocity joints in which both the outer contour serving as a cage guiding and the ball tracks are cuttingly machined. The ball tracks are machined using a disc-shaped tool with the axis of rotation arranged perpendicular to the ball track. The diameter of the disc-shaped tool is a multiple of the ball track width.

From JP-S57173413 A, a method for machining a spherical surface of a workpiece is known. The workpiece is rotated around a workpiece rotation axis at a slow rotational speed, while the tool rotates with its cylindrical cutting edge around a tool rotation axis at high speed. The tool rotation axis intersects the workpiece rotation axis at an angle.

SUMMARY

The present disclosure relates to a method and a device for machining inner joint parts of constant velocity joints. A rational process for producing inner joint parts is disclosed which enables rapid machining with high manufacturing accuracy, as well as providing a corresponding device for carrying out the process.

A method for machining ball tracks and guiding webs of an inner joint part for a constant velocity joint in one clamping comprises mechanically machining at least a first ball track in a first rotational position; rotating the inner joint part to a second rotational position for machining at least a further ball track; wherein during the rotation of the inner joint part from the first rotational position to the second rotational position at least one guiding web is mechanically machined.

With the method, inner joint parts can be manufactured with high manufacturing accuracy in minimum machining time. Specifically, only as much time is required for machining of the ball tracks and the guiding webs as is usually required for the machining of the ball tracks. The two machining processes do not influence each other because the machining of the guiding webs takes place between the machining of two ball tracks in the course of rotation from one rotational position to the next, i.e., with a time delay.

This method can be used to machine inner joint parts, especially for all joint types in which a relative guiding is provided between the outer surface of the inner joint part and the inner surface of the ball cage. These can be all of the types of joints mentioned above. The finished inner joint part comprises a longitudinal axis, a plurality of ball tracks distributed over the circumference to accommodate torque-transmitting balls and a plurality of guiding webs each being formed between two ball tracks along the circumference. The guiding webs distributed over the circumference jointly form an especially spherical guiding face for guiding the inner joint part relative to a spherical inner surface of a ball cage. The number of the ball tracks and thus the number of guiding webs depends on the type of joint and can be even or odd; for example, it can be five, six, seven, eight or ten.

The machining of the ball tracks, and thus also of the guiding webs, takes place step by step in the circumferential direction, one after the other, or in pairs, one pair after the other. After machining the first ball track or a first pair of ball tracks, the inner joint part is rotated by the pitch angle of the ball tracks or the pairs of ball tracks into the second rotational position, which follows the first rotational position in the circumferential direction. In this second rotational position, the second ball track or the second pair of tracks is then machined. In the case of constant velocity joints with several differently designed ball tracks, for example counter track joints, in which first ball tracks opening in one direction and second ball tracks opening in an opposite direction are arranged alternately over the circumference, preferably all first and then all second ball tracks are machined. For this, after machining a first ball track, the inner joint part is turned by two pitch angles to the next first ball track. After machining the last first ball track, the inner joint part is then rotated by one pitch angle to the first second ball track and the second ball tracks are machined, one after the other. With regard to the rotational movement, it is theoretically also possible that the machining tools is rotated relative to the inner joint part, although this is technically more complex than rotating the inner joint part.

Joint machining of a pair of tracks is possible with inner joint parts for a so-called twin ball joint, in which two circumferentially adjacent ball tracks run in parallel planes. Accordingly, a twin ball joint has an even number of balls and ball tracks, in particular eight.

Revolving from one rotational position to the next, also known as indexing, takes place continuously, i.e., without interruption. The pitch angle from one rotational position to the next is determined by the number and design of the ball tracks. For example, the pitch angle from one rotational position to the next is 60° for an inner part of a joint with six ball tracks extending in radial planes.

During indexing, a first of the guiding webs runs along the machining contour of the rotating web machining tool, so that the outer surface of the guiding web is machined accordingly. The web machining tool rotates about a rotational axis arranged radially to the longitudinal axis of the inner joint part. The machining contour of the web machining tool can be designed in such a way that, viewed in cross-section through the inner joint part, an imaginary tangent to the outer surface of the web in the engagement area between a machined guiding web and the machining contour, runs at an angle to the axis of rotation. This tangent forms a cone when rotating around the tool rotation axis, the vertex of which lies on the rotational axis. More specifically, the machining contour can be formed by one or more circumferentially distributed edges, respectively cutting edges that define a ring at the respective contact point with the guiding web to be machined when rotating about the axis of rotation. Alternatively, the machining contour can also be formed by a grinding surface extending around the tool rotation axis, or be part of a grinding body with such a grinding surface. For example, the grinding surface can have a conical or spherical shape, which should include a cone section or spherical section, respectively.

According to an embodiment, the web machining tool remains in the machining position required for the mechanical machining of the guiding webs, during the machining of a ball track. This means that only one infeed movement is required at the beginning of machining and one backfeed movement at the end of machining the inner joint part. In particular, it is provided that the web machining tool is radially advanced from the starting position into the machining position during the mechanical machining of the first ball track or a first pair of tracks. The web machining tool can remain in this machining position until the last guiding web has been machined. After finishing the machining of the last guiding web, the web machining tool is returned radially from the machining position back to the starting position. It is also possible, however, that the web machining tool may be slightly moved radially away from the inner joint part when machining a ball track. This can be advantageous in particular when using a spherical machining contour so that the web tool does not interfere with the machining process of the ball tracks.

According to an embodiment, the web machining tool is arranged in the machining position in such a way that the inner cone surface is contact-free relative to the inner joint part during the mechanical machining of the ball tracks. In other words, the geometry and/or arrangement of the machining surface of the web machining tool is such that a web to be machined comes into contact with the machining surface from an initial rotational position when indexing begins and then comes out of contact with the machining surface again when the next rotational position is reached, i.e., at the end of indexing. The web machining tool remains stationary during this rotation from one rotational position to the next, thereby rotating around its own axis.

The mechanical machining of the ball tracks can be carried out with both milling and grinding technology using finger or disc tools. A milling process or a grinding process can be used analogously for the mechanical machining of the guiding webs. The use of milling processes both for the machining of the ball tracks and for the machining of the webs is advantageous insofar as these can be carried out dry. It is also possible to process the ball tracks by milling and the webs by grinding, or vice versa.

A device for machining ball tracks and guiding webs of an inner joint part for a constant velocity joint in one clamping comprises a clamping unit for clamping an inner joint part; a rotationally drivable track machining tool for mechanically machining the ball tracks in respective rotational positions of the inner joint part; a rotationally drivable web machining tool for mechanically machining the guiding webs; and a setting unit for stepwise rotating the inner joint part about a longitudinal axis from one rotational position to the next; wherein the web machining tool is arranged in the circumferential direction relative to the web machining tool such that the guiding webs of the inner joint part are each mechanically processed during rotation from one rotational position of the inner joint part to the next.

The device has the same advantages of efficient manufacturing as the above-mentioned method, so that the above description is referred to in this respect to avoid repetition. It is to be understood that all method-related features can also be adapted to the device, and vice versa. In terms of installation space, it is advantageous if the web machining tool is offset by at least 90° in the circumferential direction relative to the track machining tool. In particular, the two tools can be arranged approximately diametrically opposite each other, which is meant to include an arrangement of 180°±30°, i.e., from 150° to 210°.

In particular, the web machining tool is rotatingly drivable about a rotational axis extending radially to the longitudinal axis of the inner joint part. According to an embodiment, the web machining tool has an inner machining contour that is designed to mechanically machine a respective web face when rotating the inner joint part from one rotational position to the next. The machining contour has a functional area if viewed in a longitudinal section through the web machining tool. This refers to the area that is in machining engagement with the outer surface of the respective web when indexing the inner joint part to produce the desired web contour. In this respect, the functional area can also be referred to as the machining or engagement area. During the machining of a web, the web machining tool rotates around the tool rotation axis, wherein the functional area defines a ring. In particular, the machining contour is designed in such a way that, if viewed in a cross-section through the inner joint part, a tangent applied to the machined guiding web in the contact area runs at an angle to the tool rotation axis.

According to a first possible configuration, the machining contour can be formed by one or more tool cutting edges distributed circumferentially around the tool rotation axis, the number of which can be between four and ten, for example. Only a part of a tool cutting edge, in particular a substantially punctiform area, comes into contact with the inner joint part for mechanical machining. These machining areas are located on a circular ring, respectively on an imaginary inner cone surface, during rotation around the tool rotation axis. The cutting edges can be straight or curved in the machining area, wherein they can intersect the tool axis in an imaginary extension or run obliquely thereto. According to an alternative configuration, the machining contour can have a grinding surface which accordingly comprises the functional area for machining the guiding webs, or can be part of a grinding wheel with such a grinding surface. The grinding surface can be internally conical, so that the machining area lies on a circular ring.

The inner machining contour is in particular designed and/or arranged relative to the inner joint part for mechanical machining in such a way that, in the rotational positions in which the ball tracks are machined, this machining contour is in each case contact-free relative to the inner joint part. This enables the web machining tool to remain stationary in the machining position even when the ball tracks are machined, without having any influence on the respective ball track machining process.

According to a possible configuration, the web machining tool can be a finger tool, whose axis of rotation is essentially radial to the longitudinal axis of the inner joint part. Alternatively, the web machining tool can be designed as a disk tool whose axis of rotation crosses the longitudinal axis of the inner joint part at a distance.

SUMMARY OF THE DRAWINGS

Examples are explained below on the basis of the drawing figures, which show:

FIG. 3 illustrates the arrangement shown in FIG. 1 when machining a ball track in the course of carrying out the method in a longitudinal section;

FIG. 4 illustrates the arrangement according to section line IV-IV from FIG. 3;

FIG. 5 illustrates the arrangement according to intersection line V-V from FIG. 4;

FIG. 8 illustrates the arrangement according to section line VIII-VIII from FIG. 6;

FIG. 9 illustrates the arrangement according to section line IX-IX from FIG. 8;

FIG. 10 illustrates the arrangement according to cut line X-X from FIG. 8;

FIG. 11 illustrates the arrangement according to section line XI-XI from FIG. 10;

FIG. 12 illustrates the arrangement according to section line XII-XII from FIG. 8.

DESCRIPTION

FIGS. 1 through 12 are described together below. A machining of ball tracks and guiding webs of an inner joint part 11 for a constant velocity joint is shown. Machining of the inner joint part 11 is carried out by means of a device and/or a process as disclosed herein. Constant velocity joints are a form of rotary joints which serve to transmit torque between an inner joint part and an outer joint part which are angularly movable relative to each other. In particular, a constant velocity joint comprises an inner joint part with inner ball tracks, a joint outer part with outer ball tracks, a plurality of balls each guided in a track pair of an inner and an outer ball track, and a ball cage with circumferentially distributed cage windows in which the balls are held in a common plane. Constant velocity joints can therefore also be referred to as constant velocity ball joints or constant velocity rotary ball joints.

Figure 2:
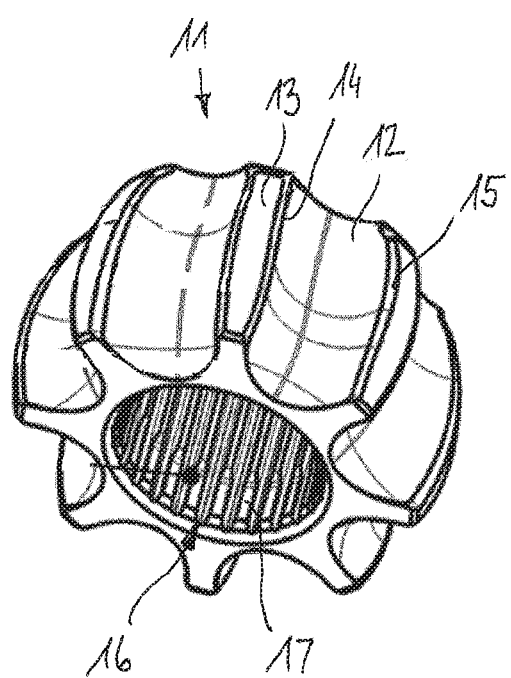
FIG. 2 illustrates an inner joint part of a constant velocity joint in perspective view.
Figure 6:
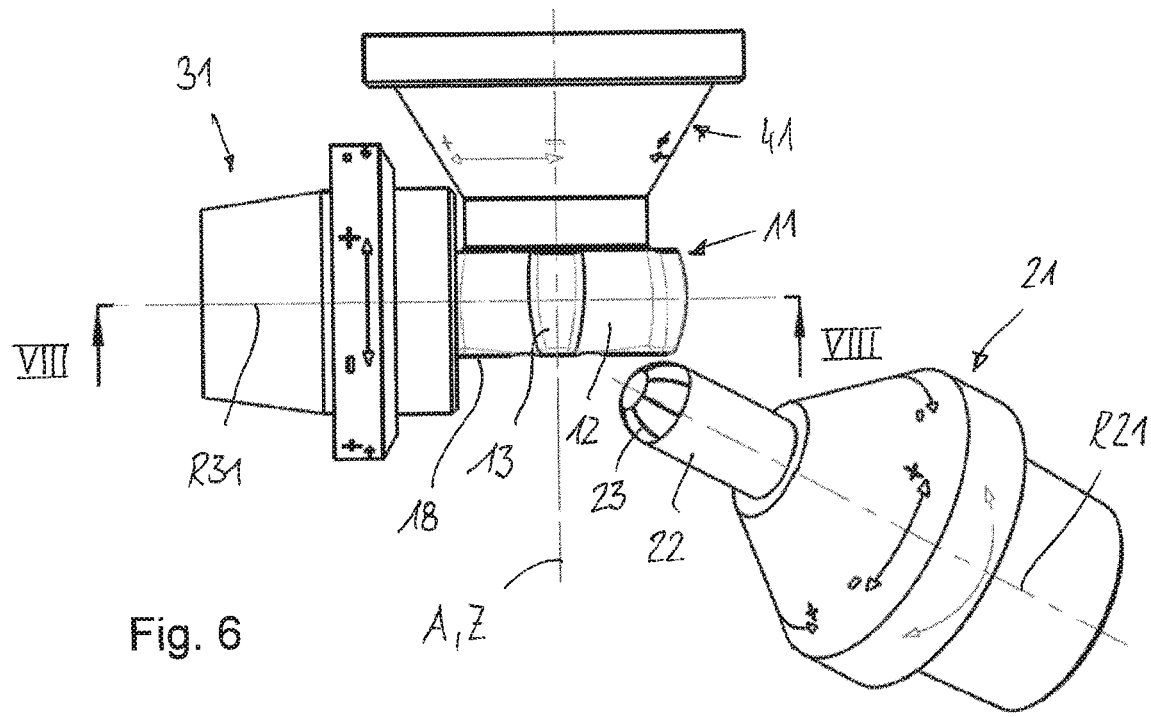
FIG. 6 illustrates the arrangement shown in FIG. 1 when machining an outer surface of the inner joint part in the course of carrying out the method in a radial view onto the longitudinal axis of the inner joint part.
Figure 7:
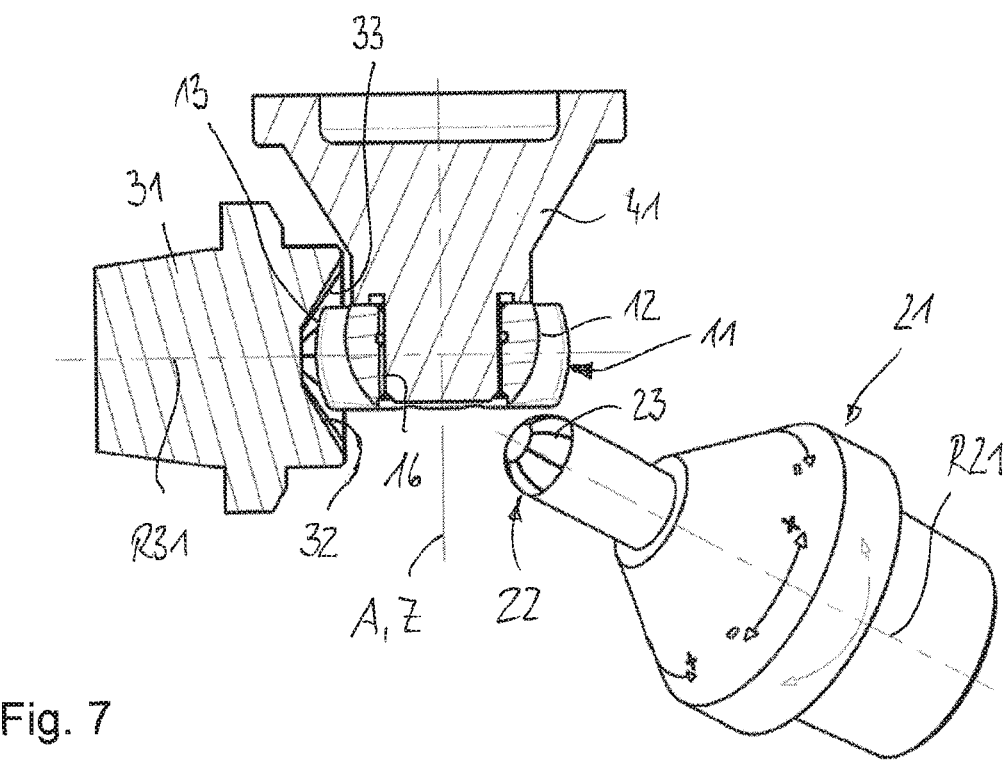
FIG. 7 illustrates the arrangement of FIG. 6 in a longitudinal section.

An exemplary inner joint part 11 for a constant velocity joint is shown in FIG. 2. The inner joint parts 11 of constant velocity joints are often referred to as ball hubs or inner races. The longitudinal axis of the inner joint part 11 is designated A and serves in the following as a reference for the arrangement and movements of the tools used. Several circumferentially distributed ball tracks 12, which have a substantially constant cross-section in the longitudinal direction, can be seen at the inner joint part 11. The ball tracks can be designed in particular as substantially semi-circular tracks, or they can have a cross-sectional contour for a two-point contact with an associated ball, for example an elliptical or Gothic cross-sectional contour. Torque-transmitting balls (not shown) of the constant velocity joint can be guided in the ball tracks 12 so as to be longitudinally movable. The ball tracks 12 are separated from each other by several webs distributed over the circumference with outer web faces 13, which are partial faces of an imaginary part-spherical guiding face of the inner joint part 11. By means of the guiding face, which can also be referred to as outer face, the inner joint part 11 is guided so as to be articulatable relative to the ball cage, respectively its inner surface (not shown). Usually, the guiding face of the inner joint part 11 mentioned above is a disc section of a sphere.

However, the guiding face can also be interrupted by central overturns or flattenings so that it forms an imaginary guiding face including two axially spaced spherical slices with a non-conducting intermediate area between them. At the guiding webs 13, respectively at the boundary edges of the ball tracks 12, edge breaks 14, 15 can be seen. Coaxial to the longitudinal axis A, the inner joint part 11 has a through opening 16 with an inner shaft toothing 17, which is provided for inserting a driving shaft journal.

The device comprises a first rotating tool 21 for rotatingly machining the ball tracks 12 and a second rotating tool 31 for rotatingly machining the guiding webs 13. The rotation axis of the track machining tool 21 is designated R21 and the rotation axis of the web machining tool 31 is designated R31. The device further comprises a clamping unit 41 in which the inner joint part 11 is received. A dashed dotted arc-shaped arrow P11 indicates a rotational setting possibility of the inner joint part 11 about the longitudinal axis A relative to the tools 21, 31. This movement possibility, which can be effected by means of a respective setting unit (not shown), is however only an option. Alternatively, the tools 21, 31 can also be designed so that they can be rotatingly adjustable about the longitudinal axis A relative to the inner joint part 11.

The ball tracks 12 and the web faces 13 of the inner joint part 11 are machined in one clamping operation. The web machining tool 21 is arranged in the circumferential direction relative to the web machining tool 31 in such a way that the guiding webs 13 of the inner joint part 11 are each mechanically processed when turning from one rotational position of the inner joint part to the next. Turning takes place step by step around the longitudinal axis A from one rotational position to the next by means of the setting unit. The rotational positions are defined by the pitch angles, which in turn result from the number of ball tracks or pairs of ball tracks to be machined. For example, an inner joint part 11 with six ball tracks 12 regularly arranged in radial planes around the circumference has six rotational positions for machining a corresponding ball track 12. The pitch angle is correspondingly 60°. Correspondingly, an inner joint part with eight ball tracks distributed regularly around the circumference has a pitch angle of 45°, so that this results in eight rotational positions for machining the ball tracks. Turning from one rotational position for machining a first ball track 12 to the next rotational position for machining the next ball track, and so on, is also called indexing.

In the present embodiment according to FIGS. 1 to 12, the track machining tool 21 is a finger tool. The finger tool 21 is aligned according to the ball track 12 to be produced and moved relative thereto. For machining ball tracks 12 lying in radial planes E12, the finger tool 21 is aligned so that its axis of rotation R21 intersects the longitudinal axis A of the inner joint part 11 at an angle. For other shapes of ball tracks, the alignment and travel of the finger tool 21 are adjusted accordingly. For example, the finger tool 21 for so-called twin ball joints, in which respective two adjacent ball tracks 12 run in parallel planes, is moved with its axis of rotation R21 in a plane parallel to a longitudinal center plane of the inner joint part 11. This can be done with a set angle of the rotation axis R21 of the finger tool 21 relative to the longitudinal axis A of the inner joint part 11. Specifically, a milling tool 21 is presently used, which has a milling head 22 with individual cutting edges 23, respectively cutting segments distributed over the circumference. The outer contour and/or alignment of the milling head 22 is matched to the cross-sectional contour of the ball tracks 12 to be produced. For a round track contour, for example, a milling head 22 with a spherical machining contour can be used, which is moved with its rotation axis R21 perpendicular to the longitudinal axis A of the inner joint part A. To create a non-circular track cross-section for a two-point contact with a ball, the finger tool 21 can be angled as shown in FIG. 5.

The web machining tool 31 is clearly offset in the circumferential direction relative to the track machining tool 21, wherein a circumferential offset of at least 90° is advantageous so that the tools have sufficient space for the respective machining. The rotation axis R31 of the web machining tool 31 extends radially to the longitudinal axis A of the inner joint part 11, i.e. the rotation axis R31 intersects the longitudinal axis A perpendicularly. It can be seen in particular in FIGS. 1 and 7 that the web machining tool 31 has an inner conical machining contour 32 which is formed to mechanically machine at least one web face 13 when revolving the inner joint part 11 from one rotational position to the next.

Figure 1:
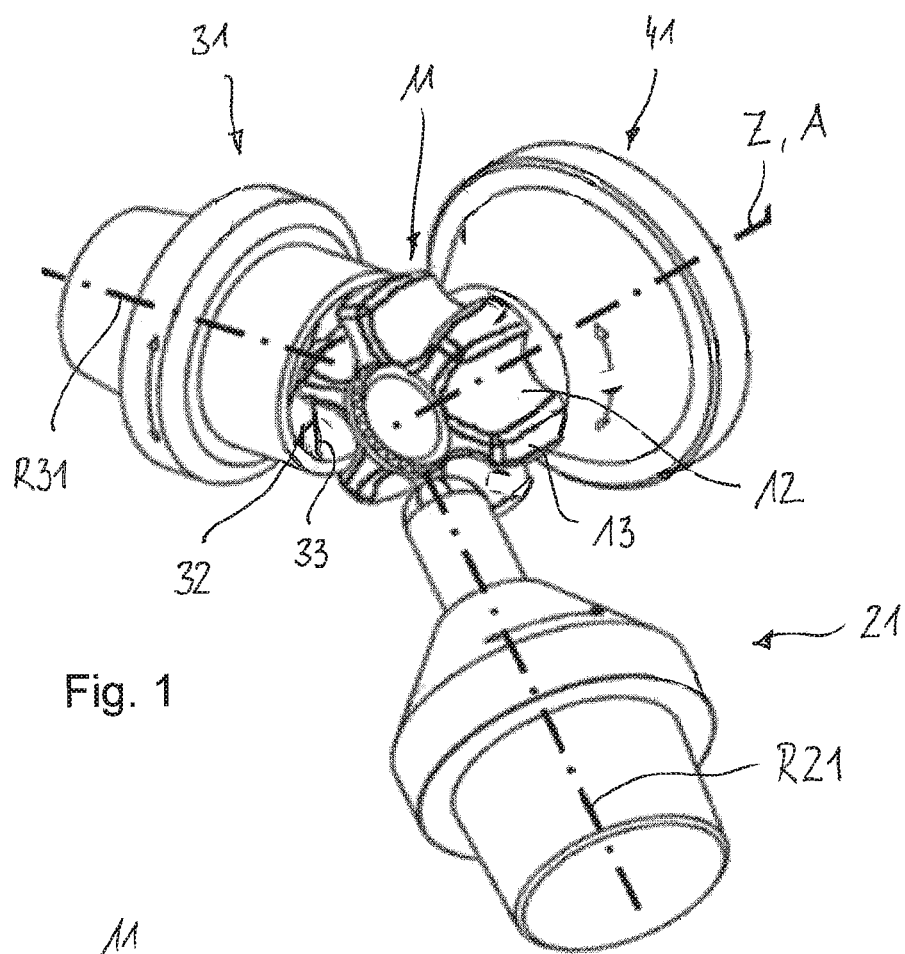
FIG. 1 illustrates an arrangement for carrying out a method for machining ball tracks and guiding webs of an inner joint part for a constant velocity joint in a perspective view in a first embodiment.

FIGS. 3 to 5 show the arrangement according to FIG. 1 in a first process step during the machining of a ball track 12. Herein, FIG. 3 shows a longitudinal section in a sectional plane that is spanned by the longitudinal axis A of the inner joint part 11, respectively the clamping device 41, and the rotational axis R31 of the web machining tool 31. The movement of the web machining tool 31 relative to the inner joint part 11 is such that the tool 21 with its rotation axis R21 is moved along the ball track 12 to be machined. This is in the present case in the radial plane E21 running radially to the longitudinal axis A, as can be seen in FIGS. 4 and 5 in particular.

The resulting feed movement of the finger tool 21, shown schematically with an arrow P21, takes place in a plane E21 spanned by the longitudinal axis A and the rotational axis R21. The finger tool 21 is moved such that when the finger tool 21 is moved along the ball track 12, the rotary axis R21 at each point of the track curve is arranged with a defined set angle α relative to an imaginary tangent to the respective point of the track curve. The direction of movement of the tool 21 along the ball track 12 can lead towards the clamping device 41 or away from the clamping device. In this example, the ball tracks 12 are circular arc shaped in a longitudinal section. It is to be understood, however, that any other ball track shape can also be produced.

The track machining tool 21 travels from a first axial end of the inner joint part 11 through the ball track 12 to be produced to the opposite second axial end 18 and beyond this, wherein it is out of engagement with the produced ball track 12 at the end of the travel path. This position is shown in FIG. 1, for example.

The web machining tool 31 is preferably moved to its machining position during the machining of the first ball track 12 of the inner joint part 11. For this, the web machining tool 31 with its rotation axis R31 is moved radially in the direction towards the longitudinal axis A of the inner joint part, respectively towards the clamping axis Z, up to the working position in which the web machining tool 31 is approached to the inner joint part 11. In this case, the rotation axis R31 of the web machining tool 31 runs radially to the longitudinal axis A of the inner joint part 11. It is understood, however, that the web machining tool 31 can also be moved before or after track machining.

In order to change to the machining of a further ball track $12_2$ after having completed machining of a first ball track $12_1$, the inner joint part 11 is rotated around the clamping axis Z by a pitch angle of the ball tracks 12, i.e. by 60° for the present inner joint part. This process is also known as indexing.

During indexing from one rotational position to the next, the webs of the inner joint part 11 are machined using the web machining tool 31. An intermediate position during such an indexing movement is shown in FIGS. 6 to 12. Two guiding webs 13$_1$, 13$_2$ can be seen, which extend into a cavity 34 of the web machining tool 31 and are machined accordingly by the machining contour 32 of the rotating web machining tool 31. As can be seen in particular in FIG. 7, on an inner circumferential face of the web machining tool 31 several cutting edges are arranged distributed over the circumference, whose cutting edges 33 together form the machining contour 32. The cutting edges 33 are presently straight and run at an acute angle to the tool rotation axis R31. In this case, imaginary extensions of the cutting edges 33 intersect in a point on the rotation axis R31. When tool 31 is rotated, the cutting edges 33 form an inner conical machining contour that engages the outer faces 13 of the webs for mechanical machining. As shown in particular in FIG. 8, during indexing from a first rotational position to the second rotational position, a first guiding web 13$_1$ runs along the machining face 32 of the rotating web machining tool 31 into the cavity of the tool 31, while a second guiding web 13$_2$ adjacent thereto is turned out of the cavity. During the first indexing movement, the two guiding webs 13$_1$, 13$_2$ come into contact with the machining face 32 of the rotating web machining tool 31, so that their outer faces 13$_1$, 13$_2$ are machined accordingly. For each subsequent indexing movement, substantially only the guiding web 13$_1$ turning into the web machining tool 31 is machined by the machining face 32, while the guiding web 13$_2$ turning out of tool 31 has already been machined in the course of the previous indexing movement and has the desired contour.

At the end of an indexing movement, a respective web is in the central position, i.e. the web is centered on the rotation axis R31 of the web machining tool 31. This position in turn corresponds to the machining position of a ball track 12 shown in FIGS. 3 to 5. This means that at the end of the first indexing movement, the second rotational position is reached in which the second ball track 12$_2$ adjacent to the first ball track 12$_1$ can be machined using the track machining tool 21. For this, the track machining tool 21 is moved along the second ball track 12$_2$, as previously along the first ball track 12$_1$.

According to an advantageous embodiment, the web machining tool 31 remains in the machining position required for the mechanical machining of the guiding webs 13 during the machining of a ball track 12. This means that the web machining tool 31 is only fed once, i.e., at the beginning of the machining of the inner joint part 11, for example before or during the machining of the first ball track 12. Only at the end of the machining of the last web 13$_6$ is the web machining tool 31 moved away from the inner joint part 11 again, which is done by radial movement of tool 31 away from the longitudinal axis A. Now the finished inner joint part 11 can be removed from the clamping device 41 and the next inner joint part can be clamped for machining.

In order that the web machining tool 31 has no negative influence on the manufacturing process during the machining of the ball tracks 12, it is contact-free relative to the inner joint part 11 in the machining position of the ball track tool 21. The geometry of the machining face 32 of the web machining tool 31 can be designed in such a way that a web face 13 to be machined, starting from an initial rotational position, first comes into engagement with the machining face at the beginning of indexing and, when the next rotational position is reached, comes out of engagement again from the machining face 32. In this position there is a gap between the machining face 32 of the web tool 31 and the web arranged in the cavity, as can be seen in particular in FIGS. 4 and 5. The web machining tool 31 remains stationary during this rotation from one rotational position to the next, thereby rotating around its own axis.

The machining of the ball tracks 12$_1$-12$_6$ and thus also of the guiding webs 13$_1$-13$_6$, is carried out step by step in circumferential direction one after the other. After machining the first ball track 12$_1$, the inner joint part 11 is turned by the pitch angle of the ball tracks 12 into the second rotational position, which follows the first rotational position in the circumferential direction. The second ball track 12$_2$ is then machined in this second rotational position. Then the inner joint part 11 is moved by the pitch angle to the next rotational position, where the next ball track 12$_3$ is machined. This process is repeated until all ball tracks are machined. In the indexing movements from one rotational position to the next, the machining of the webs 13 takes place.

Figure 13:
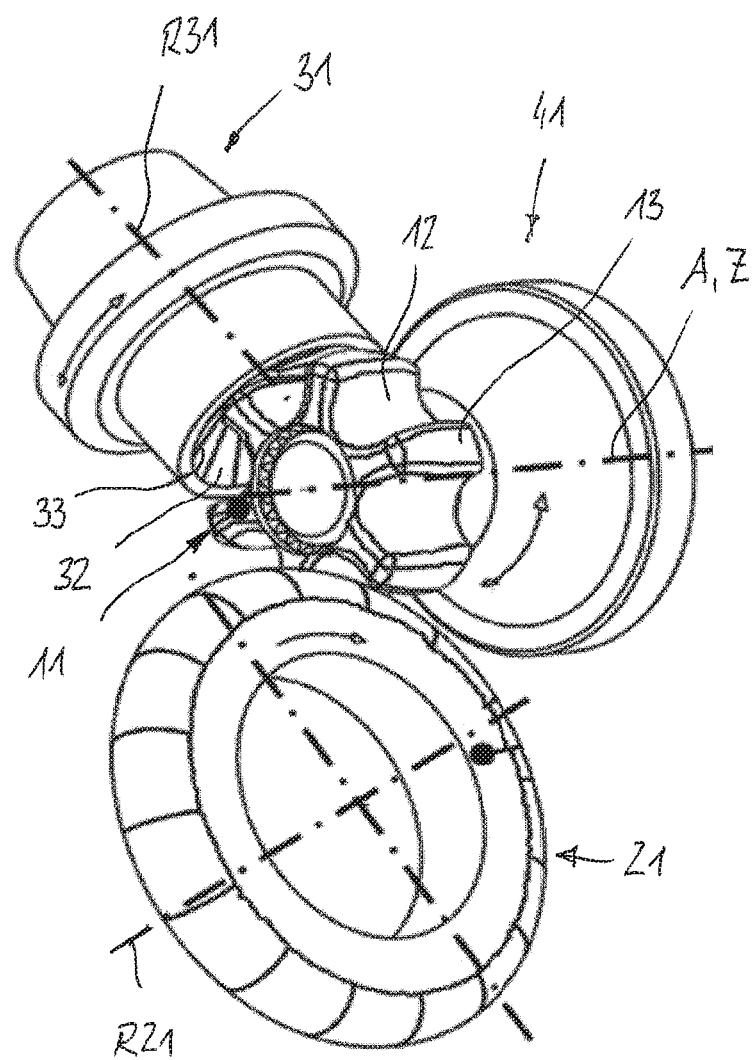
FIG. 13 illustrates an arrangement for carrying out a method for machining ball tracks and guiding webs of an inner joint part for a constant velocity joint in a perspective view in a second embodiment.

FIG. 13 shows a machining of ball tracks 12 and guiding webs 13 of an inner joint part 11 in a modified second embodiment. The present embodiment largely corresponds to the embodiment according to FIGS. 1 to 12, so that reference is made to the above description with regard to the similarities. The same or corresponding details are provided with the same reference signs as in FIGS. 1 to 12.

The representation of the arrangement is in three-dimensional view analogous to the representation in FIG. 1. Deviating from the embodiment according to FIG. 1, the track machining tool 21 has a disc-shaped profile in the present embodiment according to FIG. 13. The disk tool 21 can be designed as a milling or grinding tool rotating around a rotation axis R21. The rotation axis R21 crosses the longitudinal axis A of the inner joint part at a distance. To process a ball track 12, the track machining tool 21 with its rotation axis R21 is moved equidistantly to the contour of the ball track to be produced. The track machining tool 21 travels through the ball track 12 from a first axial end to the opposite second axial end 18. At the end of the track machining, the track machining tool 21 travels out of the ball track 12 so that it no longer engages with it. The inner joint part 11 can then be rotated by an indexing movement to machine the next ball track 12, wherein during the indexing movement the web faces 13 respectively engaging with the web machining tool 31 are machined.

The two embodiments enable in an advantageous manner the production of inner joint parts 11 with high manufacturing accuracy in a particularly short machining time. The machining of the guiding webs 13 is, in terms of time, a by-product of the necessary indexing movements. Since the machining of the guiding webs 13 takes place between the machining of two ball tracks 12 in the course of rotation from one rotational position to the next, i.e. with a time delay, the two machining steps do not influence each other. With the method and the device, respectively, all inner joint parts 11 can be machined with a spherical or at least partly spherical outer surface, for which a relative guidance is provided between the outer surface of the inner joint part 11 and the inner surface of the ball cage.

REFERENCE 11 inner joint part
12 ball track
13 guiding web/web face
14 edge breaking
15 edge breaking 16 through opening
17 toothing
18 end
21 track machining tool
22 milling head
23 cutting edges
31 web machining tool
32 machining contour
33 cutting edge
34 cavity
41 clamping unit
A longitudinal axis
E plane
P arrow (direction of movement)
R axis of rotation
clamping axis

The invention claimed is:

1. A method for machining an inner joint part for a constant velocity joint in one clamping, comprising:
   mechanically machining at least one first ball track of the inner joint part in a first rotational position; and
   rotating the inner joint part into a second rotational position for machining at least one further ball track;
   wherein at least one guiding web of the inner joint part is mechanically machined during the rotation of the inner joint part from the first rotational position to the second rotational position;
   wherein the at least one guiding web is machined by a web machining tool with a machining contour which rotates around an axis of rotation that extends radially to a longitudinal axis of the inner joint part;
   the web machining tool is positioned relative to the inner joint part in a machining position such that the machining contour is contact free relative to the inner joint part during the mechanical machining of the at least one further ball track;
   the web machining tool remains in the machining position required for machining the at least one guiding web during the mechanical machining of the at least one further ball track; and
   the web machining tool is advanced radially from a starting position into the machining position during machining of the at least one first ball track and remains in this machining position during the mechanical machining of the at least one further ball track.

2. The method of claim 1, wherein the second rotational position corresponds to the at least one further ball track that is arranged in a circumferential direction, adjacent to the at least one first ball track.

3. The method of claim 1, wherein the rotation from the first rotational position to the second rotational position is continuous.

4. The method of claim 1, wherein the web machining tool is retracted radially from the machining position into the starting position after mechanically machining a last guiding web of the at least one guiding web.

5. The method of claim 1, wherein a milling or a grinding method is used for mechanically machining of the at least one first ball track, and wherein a milling or a grinding method is used for the mechanical machining of the at least one guiding web.

6. The method of claim 1, wherein the at least one guiding web is mechanically machined offset by at least 90° in the circumferential direction relative to the at least one first ball track which was previously machined.

* * * * *